(12) United States Patent
Sun et al.

(10) Patent No.: US 8,421,533 B2
(45) Date of Patent: Apr. 16, 2013

(54) ADAPTIVE DIGITAL PREDISTORTION DEVICE AND METHOD

(75) Inventors: Gang Sun, Beijing (CN); JianMin Zhou, Beijing (CN); Zhan Shi, Beijing (CN); Hui Li, Beijing (CN); Zhiqi Wang, Beijing (CN)

(73) Assignee: Fujitsu Limited, Kawasaki (JP)

( * ) Notice: Subject to any disclaimer, the term of this patent is extended or adjusted under 35 U.S.C. 154(b) by 104 days.

(21) Appl. No.: 13/018,878

(22) Filed: Feb. 1, 2011

(65) Prior Publication Data
US 2011/0187455 A1    Aug. 4, 2011

(30) Foreign Application Priority Data
Feb. 1, 2010 (CN) .......................... 2010 1 0104444

(51) Int. Cl.
*H03F 1/26* (2006.01)
(52) U.S. Cl.
USPC ......................................................... 330/149
(58) Field of Classification Search .................. 330/149; 375/296–297; 455/114.3
See application file for complete search history.

(56) References Cited

U.S. PATENT DOCUMENTS
6,476,670 B1 * 11/2002 Wright et al. ..................... 330/2

* cited by examiner

*Primary Examiner* — Robert Pascal
*Assistant Examiner* — Khiem Nguyen
(74) *Attorney, Agent, or Firm* — Katten Muchin Rosenman LLP

(57) ABSTRACT

An adaptive digital predistortion device and method, the adaptive digital predistortion device including a predistortion unit for predistorting an input signal according to a predistortion parameter stored in a look-up table; a cost function generation unit for generating a cost function; a fixed segment point determination unit for determining a fixed segment point; and an update unit for updating parameters ($u_1$, $u_2$, $k_a$) according to the cost function to update the look-up table based on the updated parameters ($u_1$, $u_2$, $k_a$), wherein $k_a$ is an updated adaptive segment point, $u_1$ and $u_2$ are slopes on two sides of the adaptive segment point ka; and for subsequently updating parameters ($v_1$, $v_2$) according to the cost function to update the look-up table based on the updated parameters ($v_1$, $v_2$) and the fixed segment point, wherein $v_1$ and $v_2$ are slopes on two sides of the fixed segment point. Therefore, the adaptive digital predistortion device according to the present invention can obtain a good performance within an acceptable convergence time by combining the adaptive segment with the fixed segment.

9 Claims, 10 Drawing Sheets

ADAPTIVE DIGITAL PREDISTORTION DEVICE AND METHOD

FIELD OF THE INVENTION

The present invention relates to an adaptive digital predistortion device and method for use in a wireless communication system.

BACKGROUND OF THE INVENTION

With the development of wireless communication technology, various digital modulation ways (e.g., 16QAM/64QAM/OFDM) of high spectral efficiency are widely used. As compared with the conventional constant envelope modulation, an envelope of the signal transmitted by the digital modulation way of high spectral efficiency has a high Peak-to-Average-Power Ratio (PAPR). When the transmitted signal passes the nonlinear amplifier, inter-modulation items will be generated. The inter-modulation items not only cause a distortion of the in-band signal, but also lead to a spectrum leakage, thus the adjacent channels are interfered with each other.

Essentially, the predistortion technology is to obtain the inverse transfer characteristic of the power nonlinear amplifier by measuring the nonlinear transfer characteristic thereof, and integrate the inverse transfer characteristic as predistortion data into a predistortion module of the power nonlinear amplifier, so as to compensate the nonlinear distortion caused when the signal passes the power nonlinear amplifier.

It is a conventional method to approximate nonlinear inverse transfer characteristic of the amplifier through a curve-fitting technology. FIG. 1 illustrates a schematic diagram of a linear approximation acquired by a curve-fitting method. As illustrated in FIG. 1, the curve may be fitted by using a plurality of segments of straight line. For example, when the values of end points $u_1$ and $u_2$ of each segment of straight line are known, the value of point $u_k$ within the segment of straight line may be calculated by the following Equation (1):

$$G(u_k) = \frac{G(u_2) - G(u_1)}{u_2 - u_1}(u_k - u_1) + G(u_1) \quad (1)$$

Theoretically, an optimal approximation of the inverse transfer characteristic of the amplifier can be implemented through infinite piecewise fitting. However, it is obvious that in the actual predistortion system, excessive segments will cause rapid increase of the circuit complexity. Thus it is ordinary to take the segment points as parameters, and obtain an optimum segment point through a search, so as to depress the increase of the circuit complexity caused by excessive segments.

FIG. 2 illustrates an exemplary block diagram of a wireless communication system including an adaptive segment digital predistortion device in the relevant art.

As illustrated in FIG. 2, the wireless communication system includes a predistorter 100, a digital-to-analog (D/A) converter 101, a quadrature modulator 102, a mixer 103, an amplifier 104, an antenna 105, a coupler 106, an attenuator 107, a mixer 108, an analog band-pass filter 109, a power detector 110, an analog-to-digital (A/D) converter 111, an averager 112, a parameter updater 113, a look-up table updater 114, a look-up table 115 and a power calculator 116.

The power calculator 116 calculates instantaneous power of an input signal of the digital baseband. The look-up table 115 stores predistortion parameters for use in the predistortion processing the input signal. The calculated instantaneous power of the input signal of the digital baseband may be taken as an index number to retrieve corresponding predistortion parameter from the look-up table 115. The predistorter 100 predistorts the signal of the digital baseband according to the predistortion parameter to generate a predistorted signal. The D/A converter 101 performs a D/A conversion of the predistorted signal to generate an analog signal. The quadrature modulator 102 quadrature modulates the analog signal generated by the D/A converter 101, and then the mixer 103 converts the quadrature modulated signal into a RF signal. The amplifier 104 amplifies the RF signal from the mixer 103 and outputs the amplified signal (i.e., an output signal) to the antenna 105. The antenna 105 transmits the signal amplified by the amplifier 104.

The output signal of the amplifier 104 is partially fed back to the attenuator 107 through the coupler 106 coupled to an output end of the amplifier 104. The mixer 108 generates a baseband signal according to the signal attenuated by the attenuator 107. The analog band-pass filter 109 filters an outband signal from the baseband signal, and the power detector 110 calculates the instantaneous power of the filtered outband signal. The A/D converter 111 converts the instantaneous power of the outband signal output from the power detector 110 into a digital power signal. The averager 112 averages a plurality of digital power signals output from the A/D converter 111 to obtain an average digital power signal. The average digital power signal is input to the parameter updater 113 as the cost function. The parameter updater 113 updates parameters ($u_1$, $u_2$, $k_a$) through an adaptive segment algorithm, wherein $k_a$ is a segment point, $u_1$ and $u_2$ are slopes on both sides of the segment point. The look-up table updater 114 updates the look-up table by using the updated parameter according to Equation (2):

$$L(k) = \begin{cases} u_1 \times (L'(k) - L'(0)) + L'(0) & k \leq k_a \\ u_2 \times (L'(k) - L'(k_a)) + L'(k_a) & k > k_a \end{cases} \quad (2)$$

wherein, L'(●) is a look-up table before updating, L(●) is the updated look-up table, and k is an index of the look-up table. The look-up table before updating may be an initial look-up table, e.g., a look-up table generated according to the transfer characteristic of the amplifier, or a look-up table updated in other method or updated previously.

In the above adaptive segment predistortion method, the segment point $k_a$ is updated in an adaptive way. But when the number of the segment points is increased to achieve a better performance, a plurality of segment points need to be updated continuously, thus the convergence time of the adaptive digital predistortion device is increased. Particularly, when the variation of the transfer characteristic of the amplifier along with time elapse is to be compensated by the wireless communication device, excessive increase of the convergence time of the adaptive digital predistortion device cannot be accepted.

Thus, it requires an adaptive digital predistortion device and method capable of obtaining a good performance in an acceptable convergence time.

SUMMARY OF THE INVENTION

An object of the present invention is to provide an adaptive digital predistortion device and method that combine an adaptive segment with a fixed segment.

In order to achieve the above object and other additional objects, the present invention provides the following aspects.

According to an aspect of the present invention, an adaptive digital predistortion device is provided, including: a predistortion unit for retrieving a predistortion parameter from a look-up table based on an input signal to be amplified by an amplifier, predistorting the input signal according to the predistortion parameter to generate a predistorted signal to be amplified by the amplifier; a cost function generation unit for generating a cost function based on an output signal of the amplifier; a fixed segment point determination unit for determining a fixed segment point; an update unit for updating parameters ($u_1$, $u_2$, $k_a$) according to the cost function to update the look-up table based on the updated parameters ($u_1$, $u_2$, $k_a$), wherein $k_a$ is an adaptive segment point, $u_1$ is a slope on one side of the adaptive segment point $k_a$, and $u_2$ is a slope on another side of the adaptive segment point $k_a$; and for updating parameters ($v_1$, $v_2$) according to the cost function to update the look-up table based on the updated parameters ($v_1$, $v_2$) and the fixed segment point, wherein $v_1$ is a slope on one side of the fixed segment point, and $v_2$ is a slope on another side of the fixed segment point.

According to another aspect of the present invention, an adaptive digital predistortion method is provided, including: retrieving a predistortion parameter from a look-up table based on an input signal to be amplified by an amplifier; predistorting the input signal according to the predistortion parameter to generate a predistorted signal to be amplified by the amplifier; wherein the look-up table is automatically updated by: during an adaptive segment phase, generating a cost function based on an output signal of the amplifier, updating parameters ($u_1$, $u_2$, $k_a$) according to the cost function to update the look-up table based on the updated parameters ($u_1$, $u_2$, $k_a$), wherein $k_a$ is an adaptive segment point, $u_1$ is a slope on one side of the adaptive segment point $k_a$, and $u_2$ is a slope on another side of the adaptive segment point $k_a$; and during an fixed segment phase after the adaptive segment phase, re-generating a cost function based on an output signal of the amplifier, updating parameters ($v_1$, $v_2$) according to the cost function and determining a fixed segment point, to update the look-up table based on the updated parameters ($v_1$, $v_2$) and the fixed segment point, wherein $v_1$ is a slope on one side of the fixed segment point, and $v_2$ is a slope on another side of the fixed segment point.

According to another aspect of the present invention, a storage medium including machine readable program codes is provided, wherein a wireless communication system or an information processing system performs the method according to the present invention when the program codes are executed thereon.

According to another aspect of the present invention, a program product including machine executable instructions is provided, wherein a wireless communication system or an information processing system performs the method according to the present invention when the machine executable instructions are executed thereon.

The adaptive digital predistortion device and method according to the present invention acquire a segment point during an adaptive segment phase, and on this basis, acquire a better predistortion performance through the fixed segment while the convergence time also falls within an acceptable range.

These and other advantages of the present invention will be more obvious through the following detailed descriptions of the embodiments with reference to the drawings.

BRIEF DESCRIPTION OF THE DRAWINGS

The drawings illustrate preferred embodiments of the present invention and constitute a part of the Specification, for demonstrating the principle of the present invention in details together with the description. In which.

DETAILED DESCRIPTION OF THE EMBODIMENTS

Figure 1:
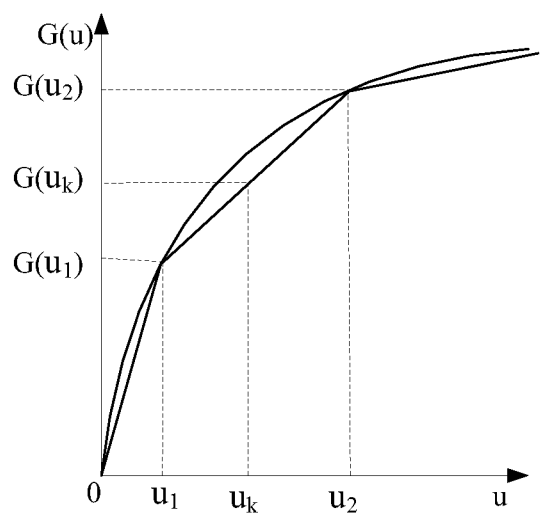
FIG. 1 illustrates a schematic diagram of a linear approximation acquired by a curve-fitting method.
Figure 2:
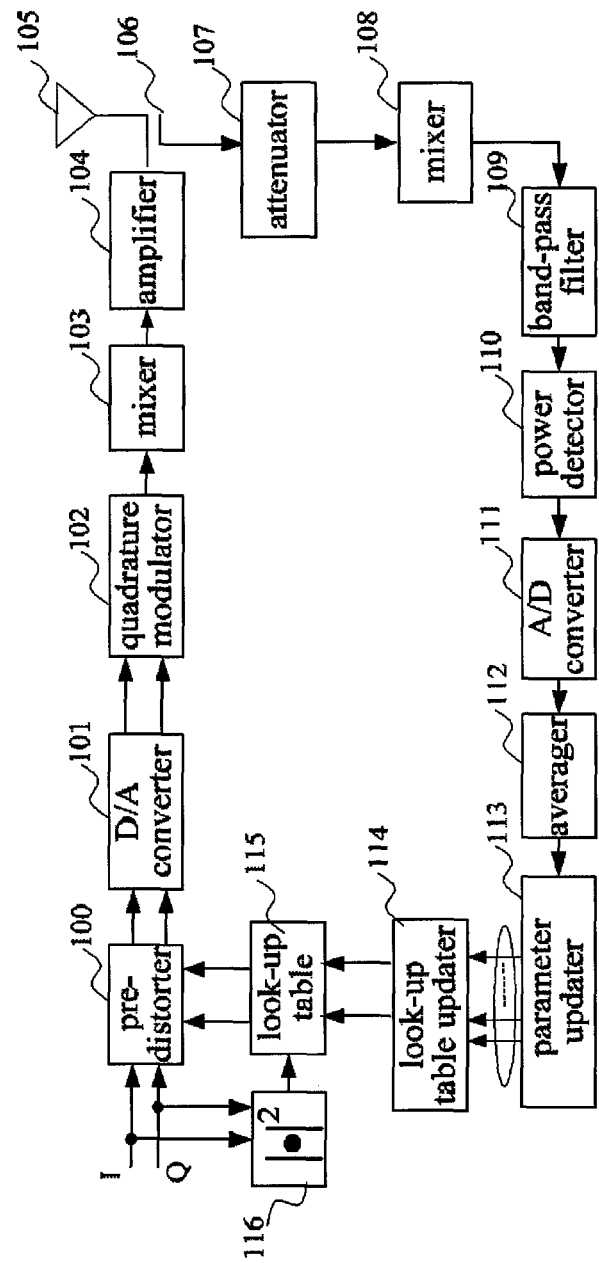
FIG. 2 illustrates an exemplary block diagram of a wireless communication system including an adaptive segment predistortion device in the relevant art.

The embodiments of the present invention are described with reference to the drawings. To be noted, for the purpose of clearness, representations and descriptions of components and processing unrelated to the present invention and having been known by a person skilled in the art are omitted in the drawings and Description.

The Description and drawings disclose the specific embodiments of the present invention in details, and point out the ways in which the principle of the present invention may be adopted. It shall be appreciated that the range of the present invention is not limited thereby. In the range of the spirit and provisions of the accompanied claims, the present invention includes many changes, modifications and equivalents.

The features described and/or illustrated with respect to one embodiment may be used in one or more other embodiments in the same or similar way, combined with the features in other embodiments, or replace the features in other embodiments.

It shall be emphasized that the term "comprise/include" or "comprising/including" used in this Specification specify the presence of features, elements, steps or components, but does not preclude the presence or addition of one or more other features, elements, steps, or components.

The present invention provides an adaptive digital predistortion device and method that combine an adaptive segment with a fixed segment. The device and method acquire a segment point through the adaptive segment, and on this basis, acquire a better performance through the fixed segment while the convergence time also falls within an acceptable range.

An adaptive digital predistortion device and method according to the present invention can be applied to various wireless communication systems, such as GSM, CDMA, LTE and LTE-A. Further, the wireless communication system in the present invention may be a base station or a relay station, or an user equipment like cell phone.

The First Embodiment

The adaptive digital predistortion device and method according to the first embodiment of the present invention are described as follows with reference to FIGS. 3-5.

Figure 3:
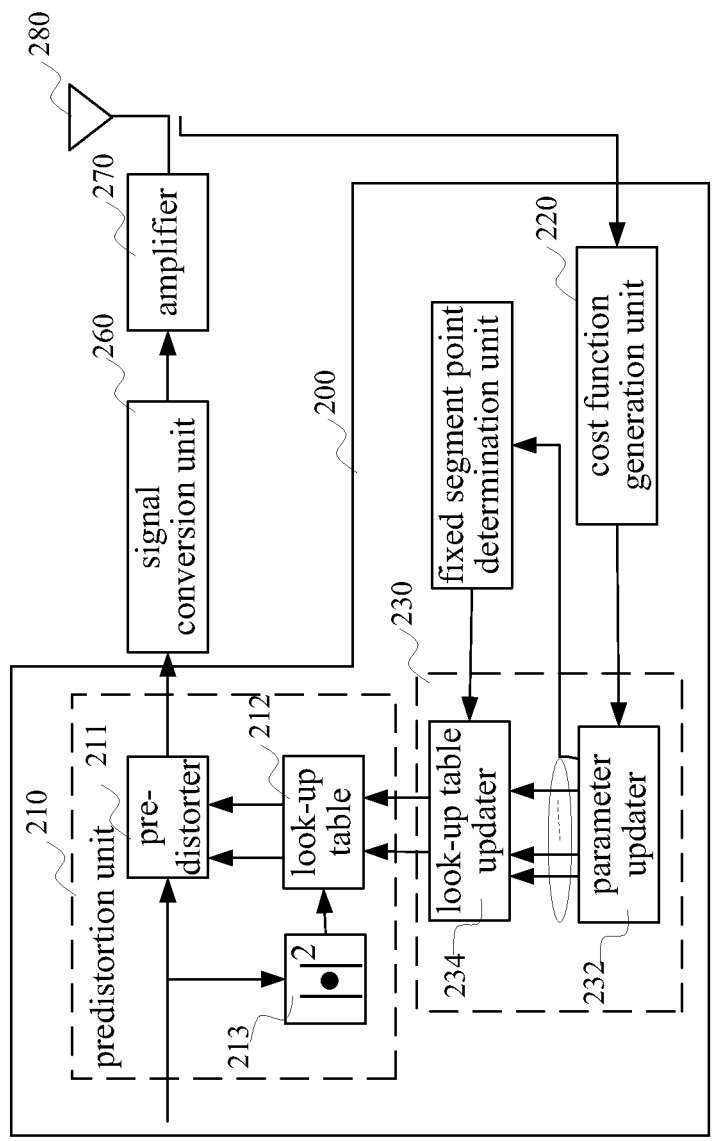
FIG. 3 illustrates an exemplary block diagram of a wireless communication system including an adaptive digital predistortion device according to a first embodiment of the present invention.

FIG. 3 illustrates an exemplary block diagram of a wireless communication system including an adaptive digital predistortion device according to the first embodiment of the present invention; FIG. 4 illustrates an exemplary flowchart of an adaptive digital predistortion method according to the first embodiment of the present invention; and FIG. 5 illustrates a detailed block diagram of a wireless communication system including an adaptive digital predistortion device according to the first embodiment of the present invention.

As illustrated in FIG. 3, the wireless communication system includes: a predistortion unit 210 comprising: a predistorter 211 for performing a predistortion of an input signal according to predistortion parameter, a look-up table 212 storing the predistortion parameter, and a power calculator 213 for calculating instantaneous power of the input signal; a cost function generation unit 220 for generating a cost function according to an output signal of an amplifier; an update unit 230 comprising a parameter updater 232 for updating the predistortion parameter and a look-up table updater 234 for updating the look-up table; a fixed segment point determination unit 240 for determining a fixed segment point; a signal conversion unit 260 for converting the predistorted signal output from the predistorter 211 into a RF signal; an amplifier 270 for amplifying the RF signal; and an antenna 280 for transmitting the amplified RF signal. The predistortion unit 210, the cost function generation unit 220, the parameter updater 232, the fixed segment point determination unit 240 and the look-up table updater 234 constitute the adaptive digital predistortion device according to the first embodiment of the present invention. The predistortion unit 210, the cost function generation unit 220, the parameter updater 232, the fixed segment point determination unit 240 and the look-up table updater 234 are implemented using digital circuits, such as, for example, DSP, FPGAs, ASICs and the like and correspond to a processor described in claims. The digital predistortion process is implemented by the processor 200 of FIG. 3 and claims.

The predistorter 211, the power calculator 213, the cost function generation unit 220, the parameter updater 232, the fixed segment point determination unit 240, the look-up table updater 234, the signal conversion unit 260 and the amplifier 270 according to the present invention may be implemented by hardware circuits or executable codes, such as software, firmware, special circuit components, programs stored in computer readable medium or machine usable medium. The look-up table 212 according to the present invention may be various memories and storage units, semiconductor devices, disc units such as optical, magnetic, and magneto optical disks, and other mediums suitable for storing information.

The adaptive digital predistortion process is described in details as an adaptive segment phase and a fixed segment phase, respectively as follows.

(I) Adaptive Segment Phase

Figure 4:
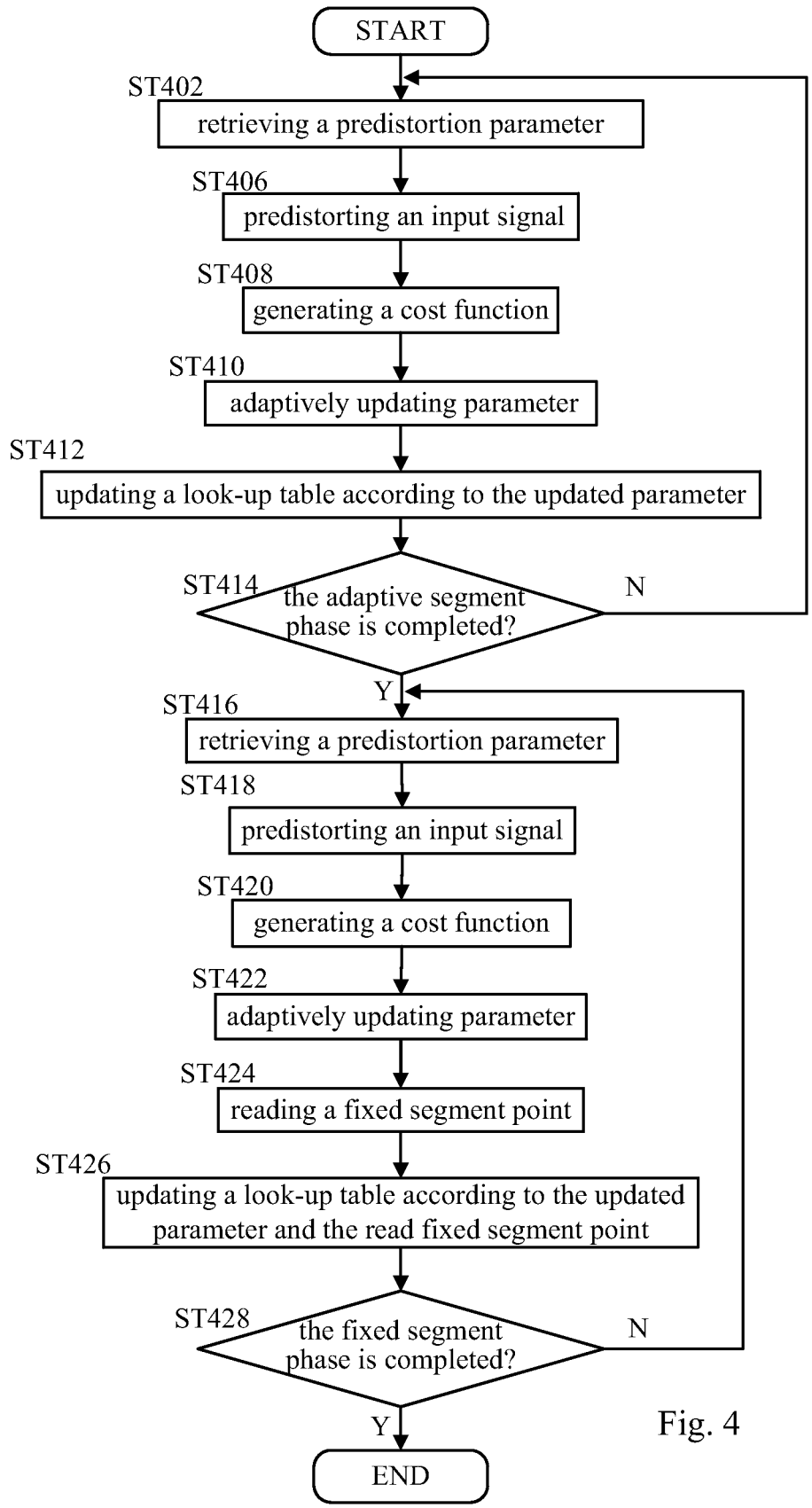
FIG. 4 illustrates an exemplary flowchart of an adaptive digital predistortion method according to a first embodiment of the present invention.

The adaptive segment phase includes steps ST402~ST414 as illustrated in FIG. 4.

Firstly in step ST402, a predistortion parameter is retrieved from a look-up table based on an input signal to be amplified by an amplifier. In details, the power calculator 213 calculates instantaneous power of the input signal, and retrieves from the look-up table 212 a predistortion parameter corresponding to the instantaneous power. But a person skilled in the art shall appreciate that retrieving the predistortion parameter corresponding to the input signal from the look-up table 212 is not limited to the above form, and may be implemented in other ways.

In step ST404, the input signal is predistorted according to the predistortion parameter to generate a predistorted signal. In details, the predistorter 211 predistorts the input signal according to the predistortion parameter retrieved from the look-up table 212. How to predistort the input signal according to the predistortion parameter is not an inventive point of the present invention. A person skilled in the art may select corresponding way of predistortion to predistort the input signal according to the predistortion parameter adopted, so as to generate the predistorted signal.

Although not illustrated in FIG. 4, in the wireless communication system, the signal conversion unit 260 converts the predistorted signal into a RF signal, and then the amplifier 270 amplifies the RF signal. The antenna 280 transmits the amplified RF signal (i.e., the output signal of the amplifier).

Figure 5:
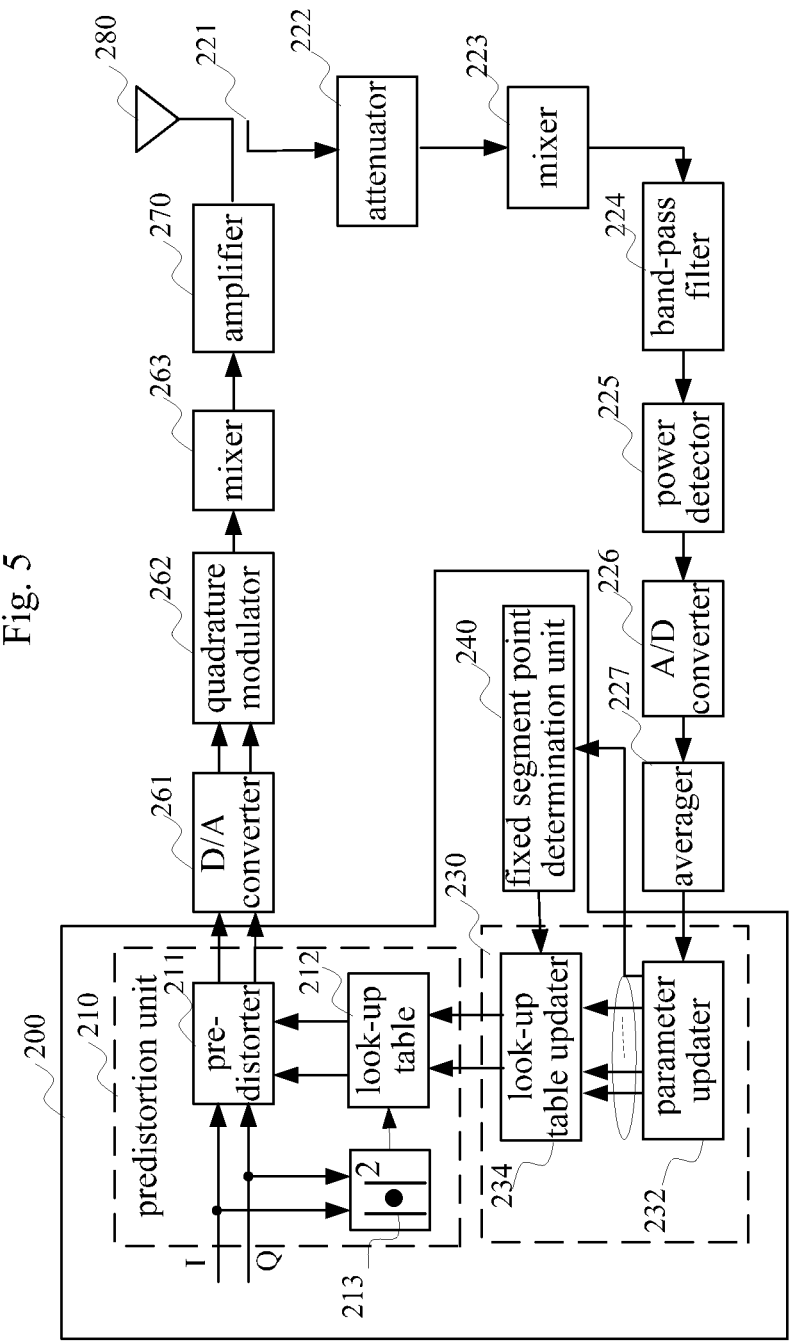
FIG. 5 illustrates a detailed block diagram of a wireless communication system including an adaptive digital predistortion device according to a first embodiment of the present invention.

In the wireless communication system as illustrated in FIG. 5, a digital-to-analog (D/A) converter 261, a quadrature modulator 262 and a mixer 263 constitute the signal conversion unit 260 in FIG. 3. In more details, the D/A converter 261 performs a D/A conversion of the predistorted signal to generate an analog signal. The quadrature modulator 262 performs a quadrature modulation of the analog signal, and then the mixer 263 converts the quadrature modulated signal into a RF signal.

The D/A converter 261, the quadrature modulator 262 and the mixer 263 may be implemented by hardware circuits or executable codes, such as software, firmware, special circuit components, programs stored in computer readable medium or machine usable medium.

Returning to FIG. 4, in step ST408, a cost function is generated according to the output signal of the amplifier. In more details, the output signal of the amplifier 270 is partially fed back to the cost function generation unit 220 through a coupling, and the cost function generation unit 220 generates a cost function according to the fed output signal. Various suitable functions that represent time-frequency characteristic of the output signal, e.g., the outband power, may be adopted as the cost function. A person skilled in the art shall appreciate that a suitable function may be selected as the cost function and the cost function may be generated according to the output signal, according to the actual demand.

With reference to FIG. 5, the outband power is taken as an example to illustrate in details how the cost function is generated.

A coupler 221, an attenuator 222, a mixer 223, an analog band-pass filter 224, a power detector 225, an analog-to-digital (A/D) converter 226 and an averager 227 in FIG. 5 form the cost function generation unit 220 in FIG. 3.

In more details, the coupler 221 is coupled to an output end of the amplifier 270 to partially feedback the output signal of the amplifier 270 to the attenuator 222. The attenuator 222 attenuates the signal from the coupler 221 such that the amplitude of the attenuated signal is suitable for the mixer 223. The mixer 223 generates a baseband signal according to the signal attenuated by the attenuator 222. The analog band-pass filter 224 filters an outband signal from the baseband signal, and outputs the filtered outband signal to the power detector 225.

The power detector 225 calculates the instantaneous outband power of the outband signal according to a predetermined algorithm. The A/D converter 226 converts the instantaneous outband power of the outband signal output from the power detector 225 into a digital outband power signal. The averager 227 averages a plurality of digital outband power signals successively output from the A/D converter 226 to obtain an average digital outband power signal. The average digital outband power signal is input to the parameter updater 232 as the cost function.

A person skilled in the art shall appreciate that the above components are not necessary and are just exemplary.

The coupler 221, the attenuator 222, the mixer 223, the analog band-pass filter 224, the power detector 225, the A/D converter 226 and the averager 227 according to the present invention may be implemented by hardware circuits or executable codes, such as software, firmware, special circuit components, programs stored in computer readable medium or machine usable medium.

Returning to FIG. 4, in step ST410, the parameter is updated according to the cost function. In more details, the parameter updater 232 updates the parameter according to the cost function generated by the cost function generation unit 220. The parameters to be updated in the adaptive segment phase include: an adaptive segment point $k_a$, a slope $u_1$ on one side of the adaptive segment point $k_a$, and a slope $u_2$ on another side of the adaptive segment point $k_a$.

In step ST412, the look-up table is updated according to the updated parameter. In more details, the look-up table updater 234 updates the look-up table 212 by using the updated parameter according to Equation (2).

In step ST414, it is judged whether the adaptive segment phase is completed. If yes, the procedure enters the fixed segment phase. If not, the procedure returns to step ST402 and continues to perform processing in the adaptive segment phase.

How to update the parameter and the look-up table and how to judge whether the adaptive segment phase is completed are not inventive points of the present invention. A person skilled in the art may update respective parameters and the look-up table and judge whether the adaptive segment phase is completed by using appropriate ways currently available or to be developed in future.

For example, with respect to parameters ($u_1$, $u_2$, $k_a$), the parameter updater 232 only updates one of them each time. For example, when the adaptive segment point $k_a$ is to be updated, only the adaptive segment point $k_a$ is updated according to the cost function in a predetermined algorithm, while the slopes $u_1$ and $u_2$ are kept unchanged. Next, the updated adaptive segment point $k_a$ is transmitted to the look-up table updater 234. The look-up table updater 234 updates the look-up table 212 according to Equation (2) by using the updated adaptive segment point $k_a$ and the unchanged slopes $u_1$ and $u_2$. Next, it is judged whether the adaptive segment processing for the adaptive segment point $k_a$ is completed by determining whether outband power is less than a predetermined threshold. When the outband power is not less than the predetermined threshold, it is judged that the adaptive segment processing for the adaptive segment point $k_a$ is not completed, otherwise it is judged that the adaptive segment processing is completed. When the adaptive segment processing of each parameter is completed, the adaptive segment phase is completed.

A person skilled in the art shall appreciate that the above descriptions are just exemplary, and the parameter update may be implemented in other ways. Further, other conditions may be adopted as conditions for judging whether the adaptive segment processing of each parameter is completed (e.g., a difference between two cost functions successively generated is less than a predetermined threshold, or the parameter has been repeatedly updated for a predetermined times).

Although FIG. 4 illustrates respective steps in the adaptive segment phase of the adaptive digital predistortion method of the present invention in a special sequence, the execution sequence of these steps may also be changed from the illustrated sequence. In addition, the illustrated two or more steps may be executed concurrently or partially concurrently. Further, commands, state variables, signals, or messages of any quantity may be added into the logic flow, so as to enhance practicability, measurement, trouble shooting, etc. It shall be appreciated that all these modifications fall within the range of the present invention.

(II) Fixed Segment Phase

After the adaptive segment phase is completed, the procedure proceeds to the fixed segment phase. The fixed segment phase includes steps ST416 to ST428 as illustrated in FIG. 4. In which, steps ST416 to ST420 are the same as steps ST402 to ST406 in the adaptive segment phase, and the corresponding description are omitted hereinafter.

In step ST422, the parameter is updated according to the cost function. In more details, the parameter updater 232 updates the parameter according to the cost function generated by the cost function generation unit 220. The parameters to be updated in the fixed segment phase include: slopes $v_1$ and $v_2$ on two sides of the segment point. Meanwhile, after updating the parameter, the parameter updater 232 transmits an enable signal to the fixed segment point determination unit 240, so as to notify the fixed segment point determination unit 240 that the parameters have been updated.

In step ST424, the fixed segment point is read. In more details, after receiving the enable signal from the parameter updater 232, the fixed segment point determination unit 240 reads from a memory therein a prestored fixed segment point $k_b$, and transmits the read fixed segment point $k_b$ to the look-up table updater 234. Optionally or additionally, the fixed segment point determination unit 240 reads a segment point input by the user through input means (not illustrated) and takes it as the fixed segment point. For example, the user may predetermine a fixed segment point according to the standard inverse transfer characteristic of the amplifier of such type provided by the manufacturer. Or the user may predetermine a fixed segment point according to a preceding empirical value.

In step ST426, the look-up table is updated according to the updated parameters and the read fixed segment point. In more details, the look-up table updater 234 updates the look-up table by using the updated parameters ($v_1$, $v_2$) and the determined fixed segment point $k_b$ in Equation (3):

$$L(k) = \begin{cases} v_1 \times (L'(k) - L'(k_b)) + L'(k_b) & k \leq k_b \\ v_2 \times (L'(k) - L'(k_b)) + L'(k_b) & k > k_b \end{cases} \quad (3)$$

L'(●) is a loop-up table before updating, L(●) is a loop-up table after updating, and k is an index number in the loop-up table.

In step ST428, it is judged whether the fixed segment phase is completed. If not, the procedure returns to step ST416 and continues to perform processing in the fixed segment phase. If completed, the procedure will be completed.

How to update the parameter and how to judge whether the fixed segment phase is completed are not inventive points of the present invention. A person skilled in the art may update respective parameters and judge whether the fixed segment phase is completed by using appropriate ways currently available or to be developed in future.

For example, with respect to parameters ($v_1$, $v_2$), the parameter updater 232 only updates one of them each time. For example, when the slope $v_1$ on one side of the segment point is to be updated, only the slope $v_1$ is updated according to the cost function in a predetermined algorithm, while the slope $v_2$ is kept unchanged. Next, the updated slope $v_1$ is transmitted to the look-up table updater 234. The look-up table updater 234 updates the look-up table 212 according to Equation (3) by using the updated slope $v_1$, the non-updated slope $v_2$, and the fixed segment point $k_b$ determined by the fixed segment point determination unit 240. Next, it is judged whether the fixed segment processing for the slope $v_1$ is completed by determining whether outband power is less than a predetermined threshold. When the outband power is not less than the predetermined threshold, it is judged that the fixed segment processing for the slope $v_1$ is not completed; and when the outband power is less than the predetermined threshold, it is judged that the fixed segment processing for the slope $v_1$ is completed. When all the parameters needing to be updated have been updated, it is judged that the fixed segment phase is completed. Alternatively or additionally, when there are a plurality of fixed segment points, the above fixed segment phase may be repeated for several times, until the parameter update for each fixed segment point is completed.

A person skilled in the art shall appreciate that the above descriptions are just exemplary, and the parameter update may be implemented in other ways. Further, other conditions may be adopted as conditions for judging whether the fixed segment processing of each parameter is completed (e.g., a difference between two cost functions successively generated is less than a predetermined threshold, or the parameter has been repeatedly updated for a predetermined times).

Although FIG. 4 illustrates respective steps in the fixed segment phase of the adaptive digital predistortion method of the present invention in a special sequence, the execution sequence of these steps may also be changed from the illustrated sequence. In addition, the illustrated two or more steps may be executed concurrently or partially concurrently. Further, commands, state variables, signals, or messages of any quantity may be added into the logic flow, so as to enhance practicability, measurement, trouble shooting, etc. It shall be appreciated that all these modifications fall within the range of the present invention.

The method as illustrated in FIG. 4 may be executed in the processor, microprocessor or controller, or executed in any appropriate way.

Figure 6:
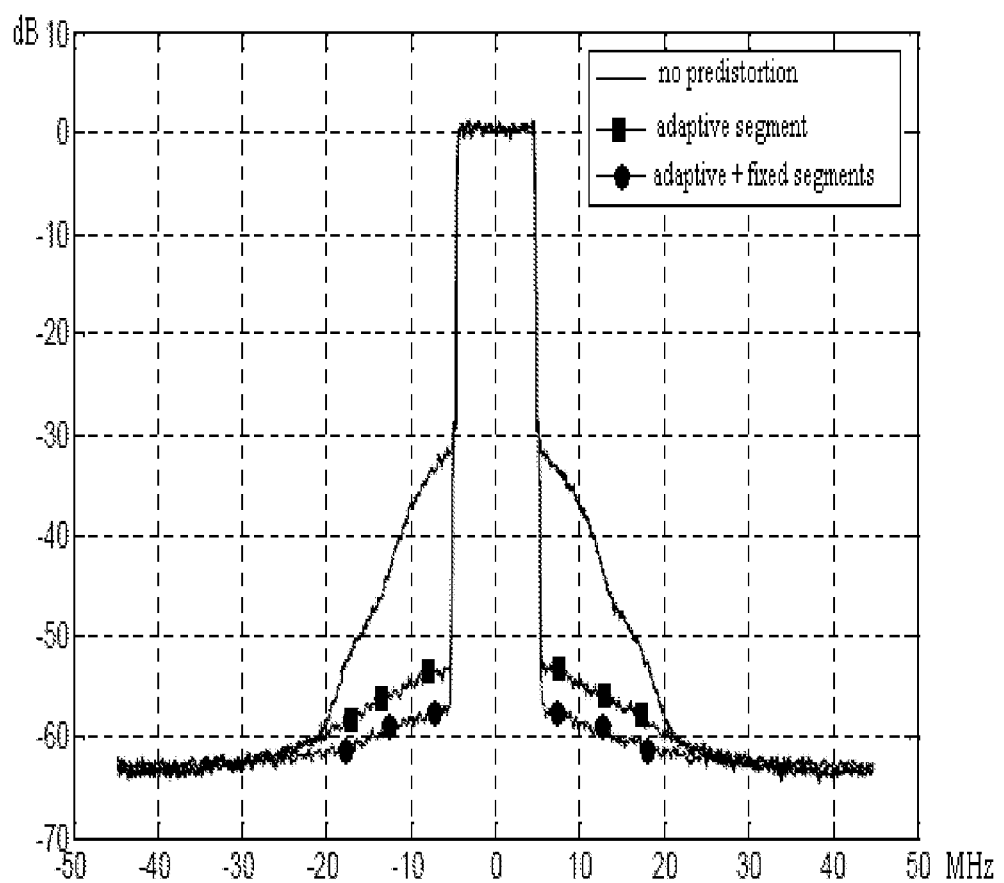
FIG. 6 illustrates a comparison result of normalized power spectrums.

FIG. 6 illustrates simulation results of normalized power spectrums achieved when a predistortion is performed through adaptive segment, when a predistortion is performed through adaptive segment and fixed segment, and when no predistortion is performed.

In FIG. 6, the vertical axis denotes the normalized power with a unit dB, and the horizontal axis denotes the frequency deviation amount in relation to the baseband center frequency, with a unit MHz. In the example illustrated by FIG. 6, one fixed segment point is adopted in the fixed segment. As can be seen from FIG. 6, the outband power obtained by the predistortion method that adopts both the adaptive segment and the fixed segment according to the present invention is decreased by about 3 dB in relation to the outband power obtained by the predistortion in the related art that only adopts the adaptive segment.

In the adaptive digital predistortion method and device according to the first embodiment of the present invention, the convergence time is still within an acceptable range, since the convergence time of the fixed segment phase is far shorter than that of the adaptive segment phase. Therefore, the adaptive digital predistortion method and device according to the first embodiment of the present invention can obtain a good performance within an acceptable convergence time by combining the adaptive segment phase with the fixed segment phase.

The Second Embodiment

The adaptive digital predistortion method and device according to the second embodiment of the present invention are the same as those according to the first embodiment of the present invention, except that a fixed segment point is determined according to a segment point updated in the adaptive segment phase. Since the block diagram of the adaptive digital predistortion device according to the second embodiment of the present invention is the same as FIG. 3, the adaptive digital predistortion device and method according to the second embodiment of the present invention will be described as follows with reference to FIG. 3, and the descriptions of the same components are omitted.

In the second embodiment of the present invention, the parameter updater 232 transmits a segment point $k_a$ updated in the adaptive segment phase to the fixed segment point determination unit 240. The fixed segment point determination unit 240 determines a fixed segment point $k_b$ according to the adaptive segment point $k_a$ transmitted from the parameter updater 232. For example, the fixed segment point determination unit 240 may select a point near the adaptive segment point $k_a$, e.g., a point having a value larger than that of the adaptive segment point $k_a$, and/or a point having a value smaller than that of the adaptive segment point $k_a$, as the fixed segment point $k_b$.

Figure 7:
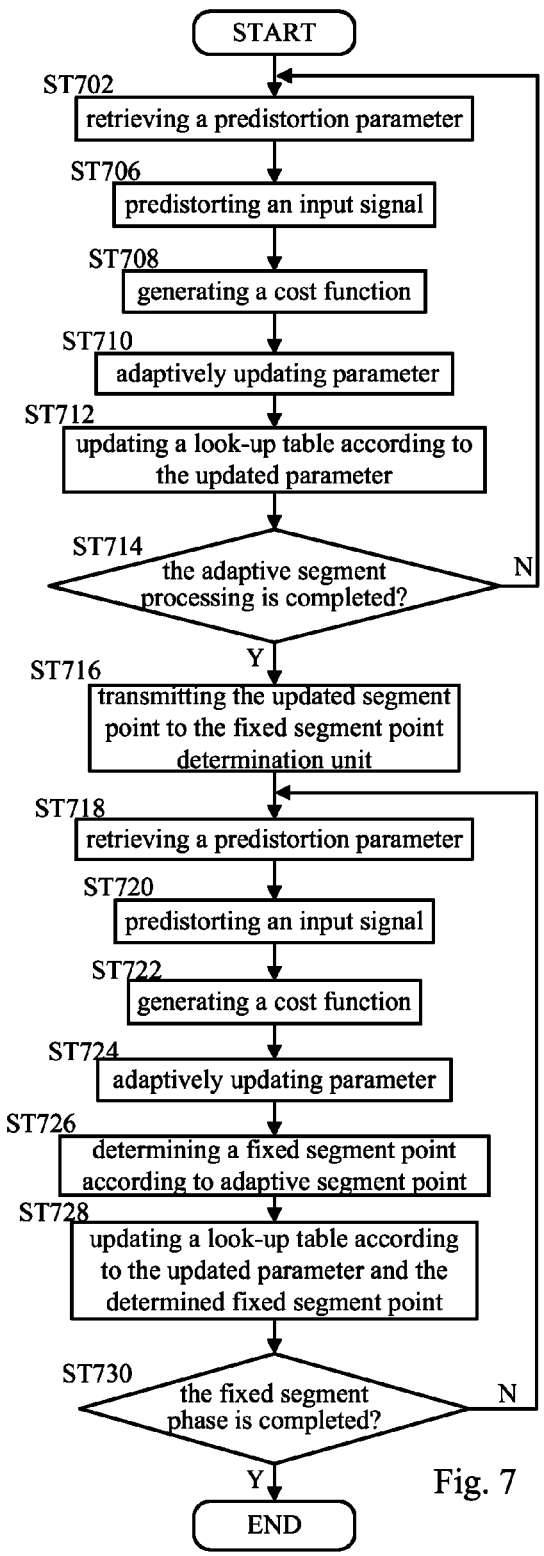
FIG. 7 illustrates an exemplary flowchart of an adaptive digital predistortion method according to a second embodiment of the present invention.

FIG. 7 illustrates an exemplary flowchart of an adaptive digital predistortion method according to a second embodiment of the present invention.

The adaptive segment phase of the adaptive digital predistortion method according to the second embodiment of the present invention is the same as the adaptive segment phase in the first embodiment. Thus steps ST702 to ST714 are the same as steps ST402 to ST414 in FIG. 4, respectively, and the corresponding description are omitted hereinafter.

In the fixed segment phase, since steps ST718 to ST726 are the same as steps ST416 to ST424 in FIG. 4, respectively, while steps ST728 to ST730 are the same as steps ST426 to ST428 in FIG. 4, respectively, the descriptions of the above steps are omitted for the purpose of conciseness, and only steps ST716 and ST726 different from the steps in FIG. 4 are concerned.

After the adaptive segment phase is completed, in step ST716, the parameter updater 232 may transmit the adaptive segment point $k_a$ updated during the adaptive segment phase to the fixed segment point determination unit 240.

In step ST726, a fixed segment point is determined according to the adaptive segment point. In details, the fixed segment point determination unit 240 determines a fixed segment point $k_b$ according to the adaptive segment point $k_a$ updated in the adaptive segment phase. For example, the fixed segment point determination unit 240 may select a point near the adaptive segment point $k_a$, e.g., a point having a value larger than that of the adaptive segment point $k_a$, and/or a point having a value smaller than that of the adaptive segment point $k_a$, as the fixed segment point $k_b$.

According to the second embodiment of the present invention, the fixed segment point is determined according to the adaptive segment point updated in the adaptive segment phase, so as to approximate the inverse transfer characteristic of the amplifier better, and achieve a better predistortion effect.

The Third Embodiment

In the predistortion device that takes outband power as a cost function of the parameter updater, the fluctuation of the cost function often causes a negative effect on the parameter update. The conventional method reduces the fluctuation of the cost function by using a long time averager. But a long time averaging will increase the convergence time of the predistortion device.

Figure 8:
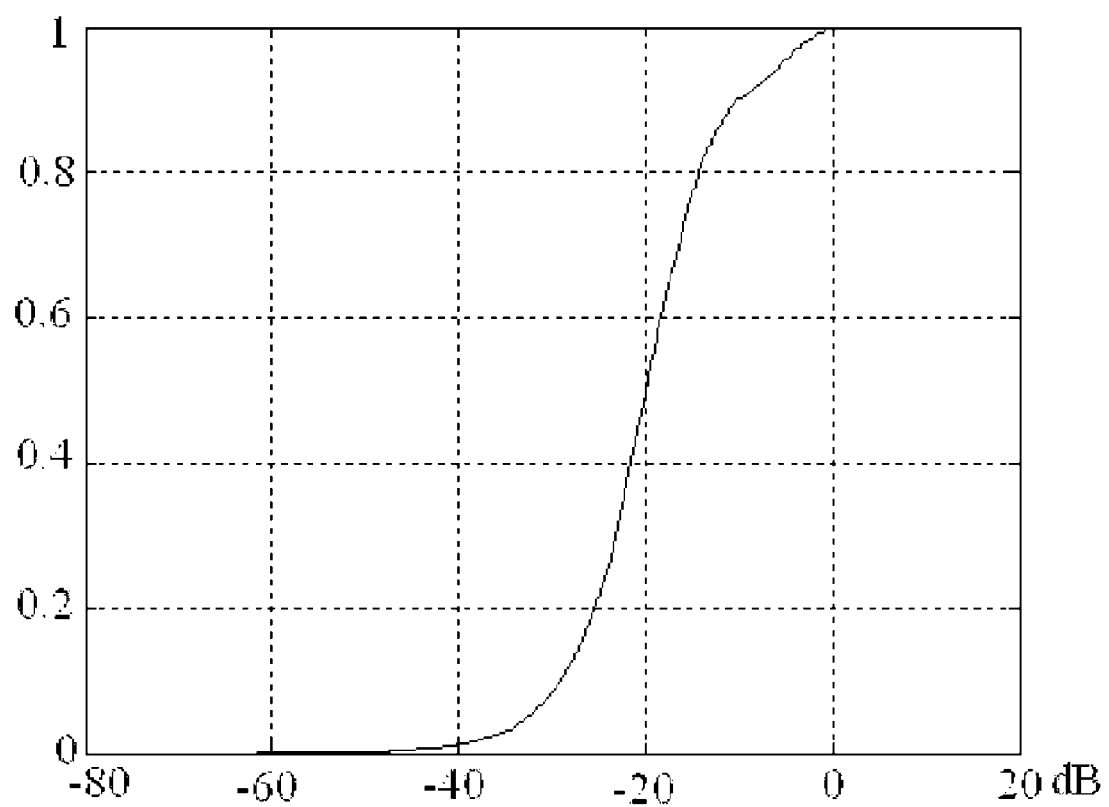
FIG. 8 illustrates a cumulative distribution function of outband power calculated from the nonlinearly amplified OFDM signal.

FIG. 8 illustrates a Cumulative Distribution Function (CDF) of outband powers calculated from the nonlinearly amplified OFDM signals. In FIG. 8, the horizontal axis denotes outband powers with an unit dB, and the vertical axis denotes cumulative distribution function F(x).

As can be seen from FIG. 8, the fluctuation range of the outband power is about 40 dB, which is very large. In order to reduce the effect on the parameter update due to the fluctuation of the outband power, an averager is usually adopted to average for multiple times to reduce the fluctuation. But the usage of the averager increases the convergence time of the predistortion device. Such increase of the convergence time cannot be accepted for some applications with a high requirement of the convergence time. For example, in case the amplifier performance is changed with the variation of the ambient temperature, in order to achieve a good predistortion effect, the look-up table shall be updated as soon as possible according to the changed inverse transfer characteristic of the amplifier.

In the predistortion device according to the third embodiment of the present invention, a stable cost function can be obtained in a short time by using a comb filter.

Figure 9:
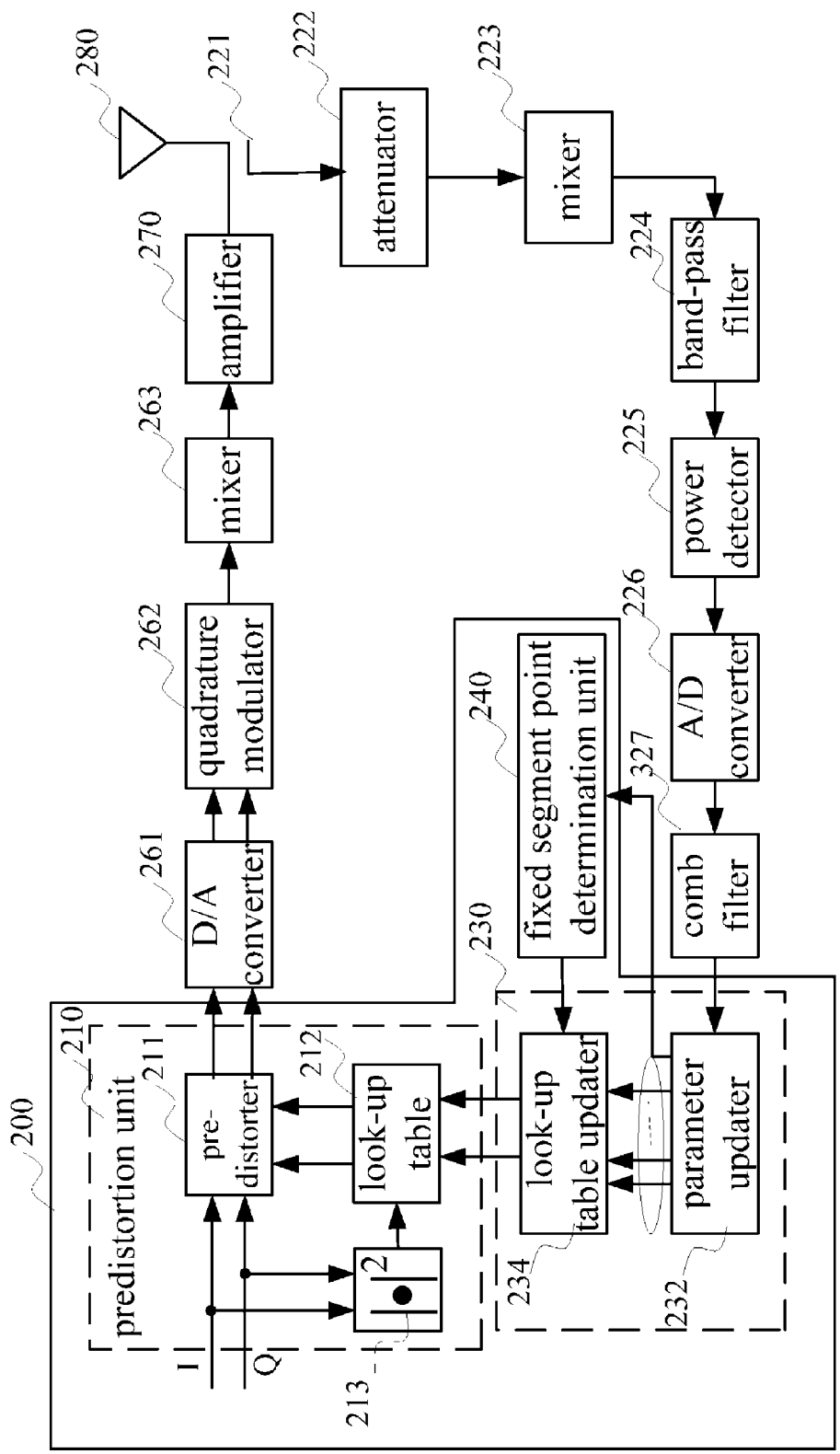
FIG. 9 illustrates a detailed block diagram of a wireless communication system including an adaptive digital predistortion device according to a third embodiment of the present invention.

FIG. 9 illustrates a schematic block diagram of a wireless communication system including an adaptive digital predistortion device according to a third embodiment of the present invention.

The components in FIG. 9 are the same as those in FIG. 5, except that the averager 227 is replaced with a comb filter 327. The same components are represented with the same reference signs, and their descriptions are omitted hereinafter. In which, the coupler 221, the attenuator 222, the mixer 223, the analog band-pass filter 224, the power detector 225 and the A/D converter 226 in FIG. 9 constitute an outband power computation part.

The comb filter 327 performs a comb filtering of the digital outband power signal converted by the A/D converter 226. Higher the order of the comb filter is, steeper the transition zone in the spectrum of the comb filter is. But too dense comb teeth are adverse to depress the fluctuation of the outband power.

For example, an 8-order comb filter may be selected. Equation (4) gives an example of a transfer function of an 8-order comb filter:

$$H(z) = 0.05 \frac{1 + z^{-8}}{1 - 0.9 z^{-8}} \quad (4)$$

A stable cost function can be obtained in a short time by using the comb filter.

Figure 10:
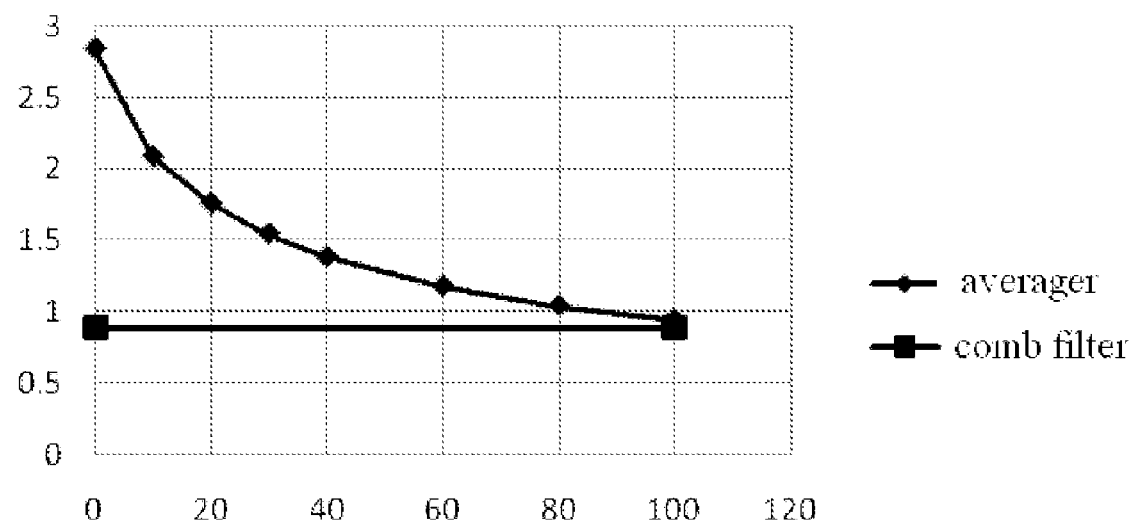
FIG. 10 illustrates a comparison result of normalized standard deviations of outband powers obtained by using comb filter and averagers of different averaging times, respectively.

FIG. 10 illustrates a comparison result of normalized standard deviations of outband power obtained by using comb filter and averagers of different averaging times, respectively. In FIG. 10, the vertical axis denotes the normalized standard deviation, and the horizontal axis denotes the averaging times of the averager.

As can be seen from FIG. 10, the normalized standard deviation of the comb filter represented by Equation (4) is substantially the same as that obtained through 100 times of averaging by the averager. That is to say, the depression effect on the fluctuation by the comb filter represented by Equation (4) is substantially equivalent to the depression effect by the averager that performs 100 times of averaging. Namely, as compared with the averager that performs 100 times of averaging, the comb filter can obtain a cost function of the same stable degree by using less data. Therefore, in case of the same fluctuation, the convergence time of adaptive digital predistortion device and method using the comb filter is shorter than that of adaptive digital predistortion device and method using the averager.

Therefore, the convergence time of the adaptive digital predistortion device and method according to the third embodiment of the present invention is further shortened.

The present invention further relates to a storage medium including storing machine readable program codes, wherein a wireless communication system or an information processing system performs the adaptive digital predistortion method according to the present invention when the program codes are executed thereon.

The present invention further relates to a program product including machine executable instructions, wherein a wireless communication system or an information processing system to perform the adaptive digital predistortion method according to the present invention when the machine executable instructions are executed thereon.

In addition, it is obvious that operation processes of the above method according to the invention may also be implemented by way of computer executable programs stored in various machine readable storage mediums.

Further, the object of the present invention may also be implemented in the following way: the storage medium storing the above executable program codes is provided to the system or equipment directly or indirectly, then the program codes are read and executed by a computer or CPU in the system or equipment. At that time, so long as the system or equipment has a function of executing the program, the embodiments of the present invention are not limited to the program, and the program may be of any form, e.g., object program, program executed by an interpreter, or scripts provided to an operating system, or the like.

The above machine readable storage mediums include, but not limited to, various memories and storage units, semiconductor devices, disk units such as optical, magnetic, and magneto optical disks, and other mediums suitable for storing information.

Further, the present invention may also be implemented by a computer that connects corresponding website in the Internet, downloads and install the computer program codes according to the present invention, and then executes the program.

Finally to be noted, in the present text, relation terms such as left and right, first and second, etc. are just used to distinguish an entity or operation from another entity or operation, and do not certainly require or imply such actual relation or sequence between these entities or operations. In addition, the terms "comprise/comprising", "include/including" or any other variant tend to cover a non-exclusive inclusion, so that process, method, article or device comprising a series of elements comprise not only those elements, but also other elements not listed clearly, or further comprise inherent elements of such process, method, article or device. In case there is no further limitation, the elements defined by a sentence "comprising a . . . " do not exclude other same elements existing in the process, method, article or device comprising the elements.

Although the embodiments of the present invention are described in details with reference to the drawings, it shall be appreciated that the embodiments described above are just adopted to illustrate the present invention and do not constitute a limitation to the present invention. A person skilled in the art may perform various modifications and changes to the above embodiments without deviating from the essence and range of the present invention. Therefore, the range of the present invention is only defined by the accompanied claims and their equivalents.

Excursuses

Excursus 1.

An adaptive digital predistortion device, comprising:
a predistortion unit for retrieving a predistortion parameter from a look-up table based on an input signal to be amplified by an amplifier, predistorting the input signal according to the predistortion parameter to generate a predistorted signal to be amplified by the amplifier;
a cost function generation unit for generating a cost function based on an output signal of the amplifier;
a fixed segment point determination unit for determining a fixed segment point;
an update unit for updating parameters ($u_1$, $u_2$, $k_a$) according to the cost function to update the look-up table based on the updated parameters ($u_1$, $u_2$, $k_a$), wherein $k_a$ is an adaptive segment point, $u_1$ is a slope on one side of the adaptive segment point $k_a$, and $u_2$ is a slope on another side of the adaptive segment point $k_a$; and for updating parameters ($v_1$, $v_2$) according to the cost function to update the look-up table based on the updated parameters ($v_1$, $v_2$) and the fixed segment point, wherein $v_1$ is a slope on one side of the fixed segment point, and $v_2$ is a slope on another side of the fixed segment point.

Excursus 2.

The adaptive digital predistortion device according to Excursus 1, wherein the cost function generation unit comprises:
an outband power computation part for computing an outband power based on the output signal of the amplifier;
a comb filter for filtering the outband power and outputting the filtered outband power to the update unit as the cost function.

Excursus 3.

The adaptive digital predistortion device according to Excursus 2, wherein the comb filter has a transfer function:

$$H(z) = 0.05 \frac{1+z^{-8}}{1-0.9z^{-8}}.$$

Excursus 4.

The adaptive digital predistortion device according to Excursus 1, wherein the fixed segment point determination unit determines the fixed segment point based on the adaptive segment point $k_a$.

Excursus 5.

The adaptive digital predistortion device according to Excursus 1, wherein the fixed segment point is determined by the fixed segment point determination unit reading a predetermined segment point as the fixed segment point.

Excursus 6.

The adaptive digital predistortion device according to Excursus 1, wherein the update unit updates the look-up table based on the updated parameters ($u_1$, $u_2$, $k_a$) by:

$$L(k) = \begin{cases} u_1 \times (L'(k) - L'(0)) + L'(0) & k \leq k_a \\ u_2 \times (L'(k) - L'(k_a)) + L'(k_a) & k > k_a, \end{cases}$$

wherein, L'(●) is a look-up table before updating, L(●) is the updated look-up table, and k is an index of the look-up table.

Excursus 7.

The adaptive digital predistortion device according to Excursus 1, wherein the update unit updates the look-up table based on the updated parameters ($v_1$, $v_2$) and the fixed segment point by:

$$L(k) = \begin{cases} v_1 \times (L'(k) - L'(k_b)) + L'(k_b) & k \leq k_b \\ v_2 \times (L'(k) - L'(k_b)) + L'(k_b) & k > k_b \end{cases}$$

wherein, $k_b$ is the fixed segment point, L'(●) is a look-up table before updating, L(●) is the updated look-up table, and k is an index of the look-up table.

Excursus 8.

An adaptive digital predistortion method, comprising:
retrieving a predistortion parameter from a look-up table based on an input signal to be amplified by an amplifier;
predistorting the input signal according to the predistortion parameter to generate a predistorted signal to be amplified by the amplifier;
wherein the look-up table is automatically updated by:
during an adaptive segment phase, generating a cost function based on an output signal of the amplifier, updating parameters ($u_1$, $u_2$, $k_a$) according to the cost function to update the look-up table based on the updated parameters ($u_1$, $u_2$, $k_a$), wherein $k_a$ is an adaptive segment point, $u_1$ is a slope on one side of the adaptive segment point $k_a$, and $u_2$ is a slope on another side of the adaptive segment point $k_a$; and
during an fixed segment phase after the adaptive segment phase, re-generating a cost function based on an output signal of the amplifier, updating parameters ($v_1$, $v_2$) according to the cost function and determining a fixed segment point, to update the look-up table based on the updated parameters ($v_1$, $v_2$) and the fixed segment point, wherein $v_1$ is a slope on one side of the fixed segment point, and $v_2$ is a slope on another side of the fixed segment point.

Excursus 9.

The adaptive digital predistortion method according to Excursus 8, wherein the cost function is generated by:
computing an outband power based on the output signal of the amplifier; and
filtering the computed outband power by a comb filter and outputting the filtered outband power as the cost function.

Excursus 10.

The adaptive digital predistortion method according to Excursus 9, wherein the comb filter has a transfer function:

$$H(z) = 0.05 \frac{1+z^{-8}}{1-0.9z^{-8}}.$$

Excursus 11.

The adaptive digital predistortion method according to Excursus 8, wherein the fixed segment point is determined based on the adaptive segment point $k_a$.

Excursus 12.

The adaptive digital predistortion method according to Excursus 8, wherein the fixed segment point is predetermined.

Excursus 13.

The adaptive digital predistortion method according to Excursus 8, wherein during the adaptive segment phase, the look-up table is updated based on the updated parameters ($u_1$, $u_2$, $k_a$) by:

$$L(k) = \begin{cases} u_1 \times (L'(k) - L'(0)) + L'(0) & k \le k_a \\ u_2 \times (L'(k) - L'(k_a)) + L'(k_a) & k > k_a \end{cases}$$

wherein, L'(●) is a look-up table before updating, L(●) is the updated look-up table, and k is an index of the look-up table.

Excursus 14.

The adaptive digital predistortion method according to Excursus 8, wherein during the fixed segment phase, the look-up table is updated based on the updated parameters ($v_1$, $v_2$) and the fixed segment point by:

$$L(k) = \begin{cases} v_1 \times (L'(k) - L'(k_b)) + L'(k_b) & k \le k_b \\ v_2 \times (L'(k) - L'(k_b)) + L'(k_b) & k > k_b, \end{cases}$$

wherein, $k_b$ is the fixed segment point, L'(●) is a look-up table before updating, L(●) is the updated look-up table, and k is an index of the look-up table.

Excursus 15.

A storage medium comprising machine readable program codes, wherein a wireless communication system or an information processing system performs the adaptive digital predistortion method according to any of Excursuses 8 to 14 when the program codes are executed thereon.

Excursus 16.

A program product comprising machine executable instructions, wherein a wireless communication system or an information processing system performs the adaptive digital predistortion method according to any of Excursuses 8 to 14 when the instructions are executed thereon.

What is claimed is:

1. An adaptive digital predistortion device, comprising:
a predistortion unit for retrieving a predistortion parameter from a look-up table based on an input signal to be amplified by an amplifier, predistorting the input signal according to the predistortion parameter to generate a predistorted signal to be amplified by the amplifier;
a cost function generation unit for generating a cost function based on an output signal of the amplifier;
a fixed segment point determination unit for determining a fixed segment point;
an update unit for updating parameters ($u_1$, $u_2$, $k_a$) according to the cost function to update the look-up table based on the updated parameters ($u_1$, $u_2$, $k_a$), wherein $k_a$ is an adaptive segment point, $u_1$ is a slope of a straight line on one side of the adaptive segment point $k_a$, and $u_2$ is a slope of a straight line on another side of the adaptive segment point $k_a$; and for updating parameters ($v_1$, $v_2$) according to the cost function to update the look-up table based on the updated parameters ($v_1$, $v_2$) and the fixed segment point, wherein $v_1$ is a slope of a straight line on one side of the fixed segment point, and $v_2$ is a slope of a straight line on another side of the fixed segment point, wherein the update unit updates the look-up table based on the updated parameters ($u_1$, $u_2$, $k_a$) by:

$$L(k) = \begin{cases} u_1 \times (L'(k) - L'(0)) + L'(0) & k \le k_a \\ u_2 \times (L'(k) - L'(k_a)) + L'(k_a) & k > k_a, \end{cases}$$

wherein, L'(●) is a look-up table before updating, L(●) is the updated look-up table, and k is an index of the look-up table, and
wherein the update unit updates the look-up table based on the updated parameters ($v_1$, $v_2$) and the fixed segment point by:

$$L(k) = \begin{cases} v_1 \times (L'(k) - L'(k_b)) + L'(k_b) & k \le k_b \\ v_2 \times (L'(k) - L'(k_b)) + L'(k_b) & k > k_b \end{cases}$$

wherein, $k_b$ is the fixed segment point, L'(●) is a look-up table before updating, L(●) is the updated look-up table, and k is an index of the look-up table.

2. The adaptive digital predistortion device according to claim 1, wherein the cost function generation unit comprises:
an outband power computation part for computing an outband power based on the output signal of the amplifier;
a comb filter for filtering the outband power and outputting the filtered outband power to the update unit as the cost function.

3. The adaptive digital predistortion device according to claim 2, wherein the comb filter has a transfer function:

$$H(Z) = 0.05 \frac{1+z^{-8}}{1-0.9Z^{-8}}.$$

wherein z is the outband power.

4. The adaptive digital predistortion device according to claim 1, wherein the fixed segment point determination unit determines the fixed segment point based on the adaptive segment point $k_a$.

5. An adaptive digital predistortion device, comprising:
a processor for retrieving a predistortion parameter from a look-up table based on an input signal to be amplified by an amplifier, predistorting the input signal according to the predistortion parameter to generate a predistorted signal to be amplified by the amplifier; for generating a cost function based on an output signal of the amplifier; for determining a fixed segment point; for updating parameters ($u_1$, $u_2$, $k_a$) according to the cost function to update the look-up table based on the updated parameters ($u_1$, $u_2$, $k_a$), wherein $k_a$ is an adaptive segment point, $u_1$ is a slope of a straight line on one side of the adaptive segment point $k_a$, and $u_2$ is a slope of a straight line on another side of the adaptive segment point $k_a$; and for updating parameters ($v_1$, $v_2$) according to the cost function to update the look-up table based on the updated parameters ($v_1$, $v_2$) and the fixed segment point, wherein $v_1$ is a slope of a straight line on one side of the fixed segment point, and $v_2$ is a slope of a straight line on another side of the fixed segment point;

a converter for converting the predistorted signal into a radio signal; and an amplifier for amplifying the radio signal, wherein the processor updates the look-up table based on the updated parameters ($u_1$, $u_2$, $k_a$) by:

$$L(k) = \begin{cases} u_1 \times (L'(k) - L'(0)) + L'(0) & k \leq k_a \\ u_2 \times (L'(k) - L'(k_a)) + L'(k_a) & k > k_a \end{cases}$$

wherein, $L'(\bullet)$ is a look-up table before updating, $L(\bullet)$ is the updated look-up table, and k is an index of the look-up table, and wherein the processor updates the look-up table based on the updated parameters ($v_1$, $v_2$) and the fixed segment point by:

$$L(k) = \begin{cases} v_1 \times (L'(k) - L'(k_b)) + L'(k_b) & k \leq k_b \\ v_2 \times (L'(k) - L'(k_b)) + L'(k_b) & k > k_b \end{cases}$$

wherein, $k_b$ is the fixed segment point, $L'(\bullet)$ is a look-up table before updating, $L(\bullet)$ is the updated look-up table, and k is an index of the look-up table.

6. An adaptive digital predistortion method, comprising:

retrieving a predistortion parameter from a look-up table based on an input signal to be amplified by an amplifier; and predistorting the input signal according to the predistortion parameter to generate a predistorted signal to be amplified by the amplifier;

wherein the look-up table is automatically updated by:

during an adaptive segment phase, generating a cost function based on an output signal of the amplifier, updating parameters ($u_1$, $u_2$, $k_a$) according to the cost function to update the look-up table based on the updated parameters ($u_1$, $u_2$, $k_a$), wherein $k_a$ is an adaptive segment point, $u_1$ is a slope of a straight line on one side of the adaptive segment point $k_a$, and $u_2$ is a slope of a straight line on another side of the adaptive segment point $k_a$; and during a fixed segment phase after the adaptive segment phase, re-generating a cost function based on an output signal of the amplifier, updating parameters ($v_1$, $v_2$) according to the cost function and determining a fixed segment point, to update the look-up table based on the updated parameters ($v_1$, $v_2$) and the fixed segment point, wherein $v_1$ is a slope of a straight line on one side of the fixed segment point, and $v_2$ is a slope of a straight line on another side of the fixed segment point, wherein during the adaptive segment phase, the look-up table is updated based on the updated parameters ($u_1$, $u_2$, $k_a$) by:

$$L(k) = \begin{cases} u_1 \times (L'(k) - L'(0)) + L'(0) & k \leq k_a \\ u_2 \times (L'(k) - L'(k_a)) + L'(k_a) & k > k_a \end{cases},$$

wherein, $L'(\bullet)$ is a look-up table before updating, $L(\bullet)$ is the updated look-up table, and k is an index of the look-up table, and wherein during the fixed segment phase, the look-up table is updated based on the updated parameters ($v_1$, $v_2$) and the fixed segment point by:

$$L(k) = \begin{cases} v_1 \times (L'(k) - L'(k_b)) + L'(k_b) & k \leq k_b \\ v_2 \times (L'(k) - L'(k_b)) + L'(k_b) & k > k_b \end{cases}$$

wherein, $k_b$ is the fixed segment point, $L'(\bullet)$ is a look-up table before updating, $L(\bullet)$ is the updated look-up table, and k is an index of the look-up table.

7. The adaptive digital predistortion method according to claim 6, wherein the cost function is generated by:

computing an outband power based on the output signal of the amplifier; and filtering the computed outband power by a comb filter and outputting the filtered outband power as the cost function.

8. The adaptive digital predistortion method according to claim 7, wherein the comb filter has a transfer function:

$$H(Z) = 0.05 \frac{1 + z^{-8}}{1 - 0.9 z^{-8}}.$$

wherein z is the outband power.

9. The adaptive digital predistortion method according to claim 6, wherein the fixed segment point is determined based on the adaptive segment point $k_a$.

* * * * *